March 23, 1937. C. H. HILL 2,074,844
METALWORKING MACHINE
Filed Sept. 8, 1934    3 Sheets-Sheet 1
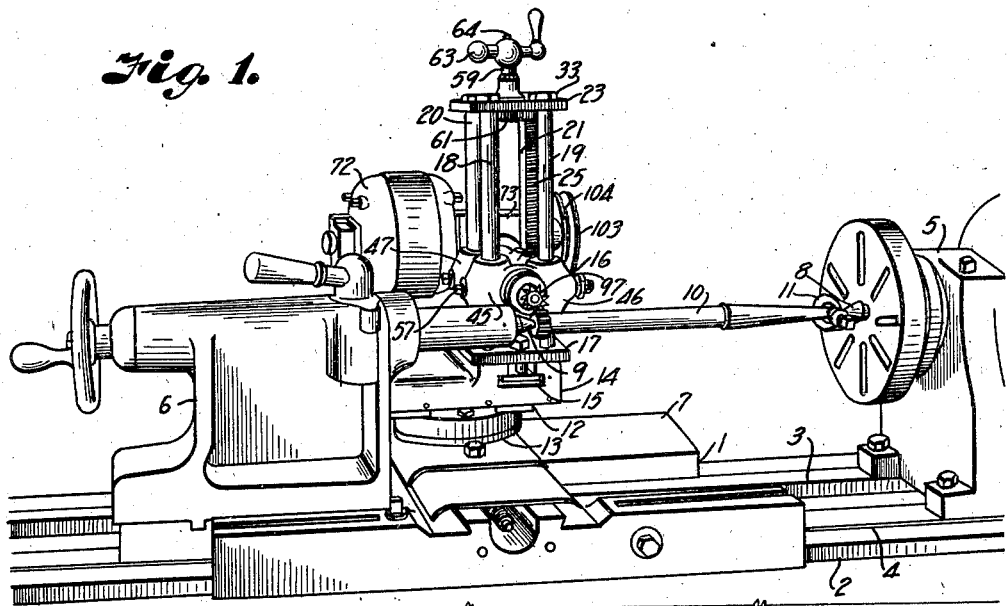
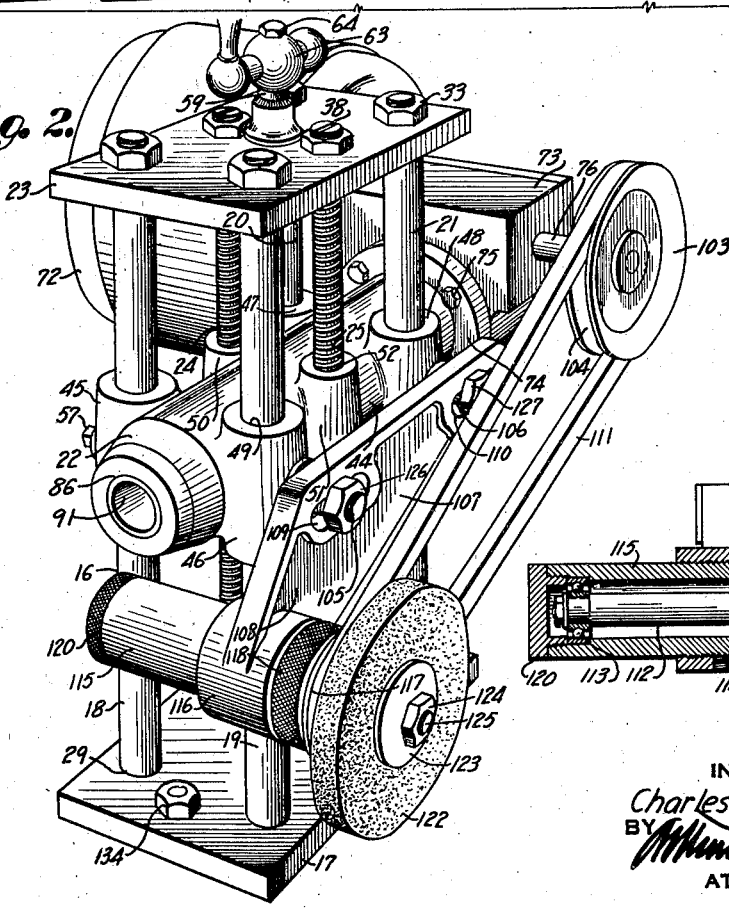
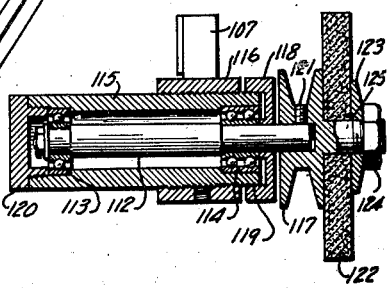
INVENTOR
Charles H. Hill
BY
ATTORNEY

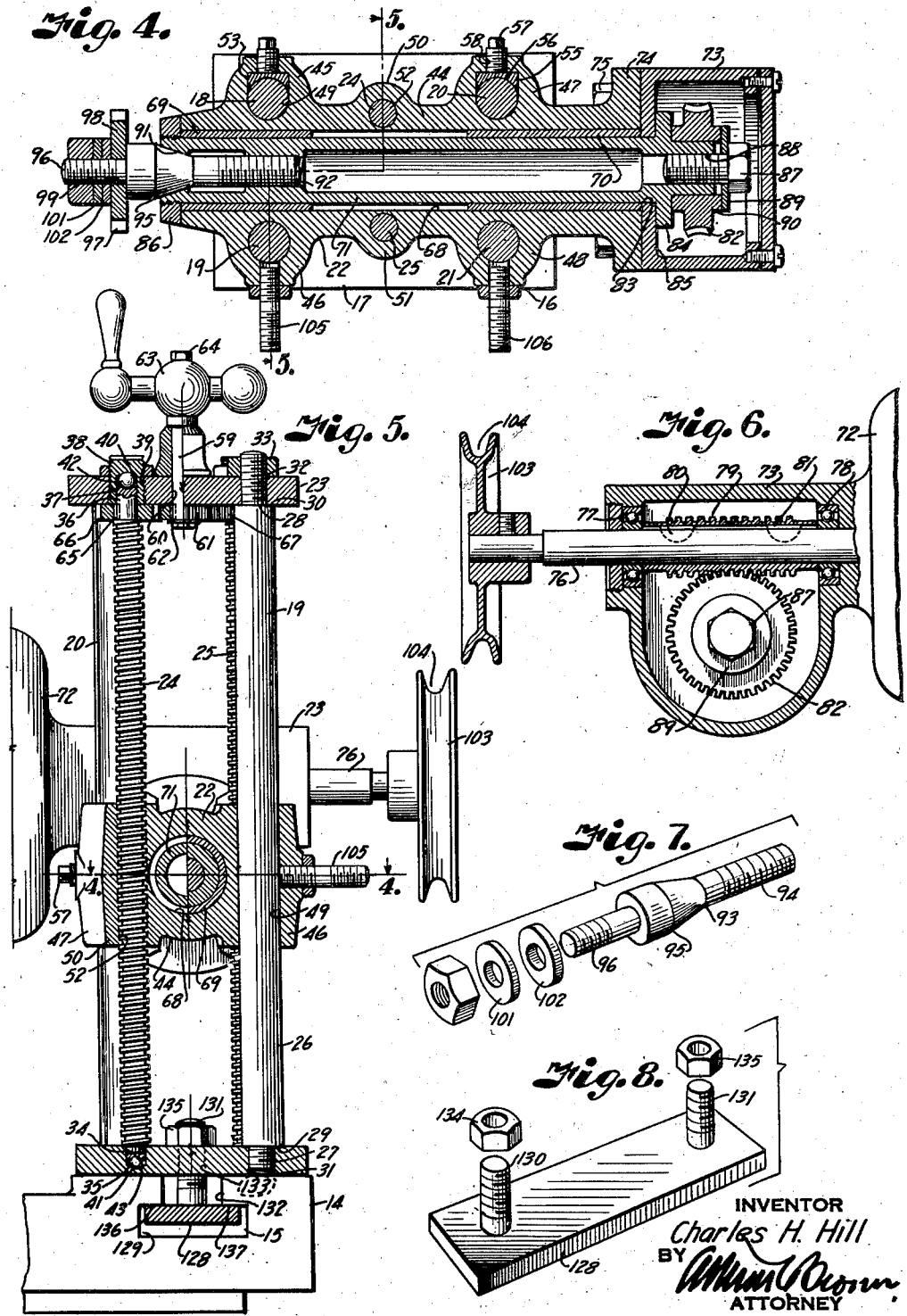

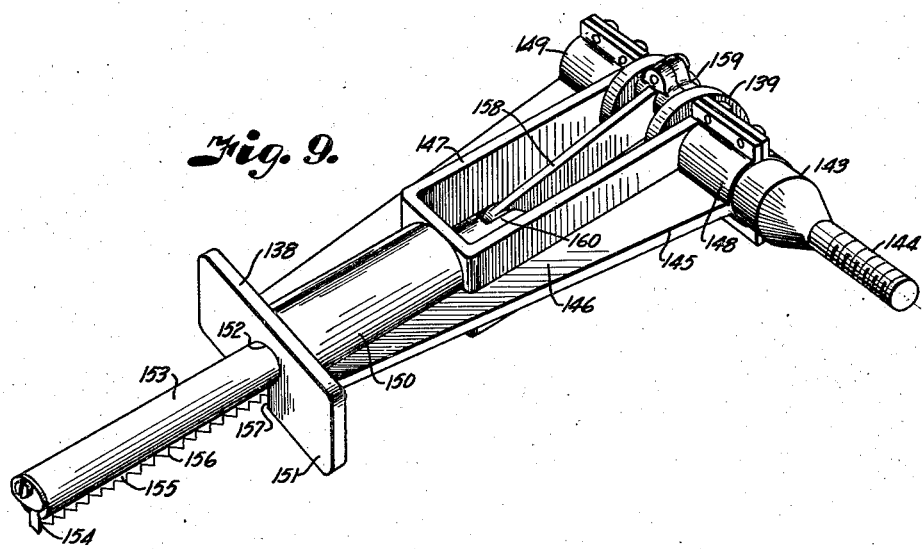
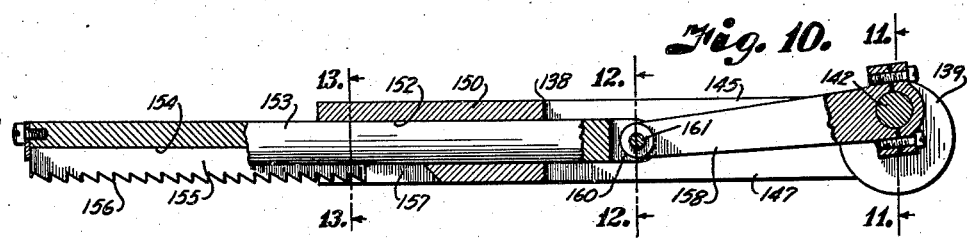
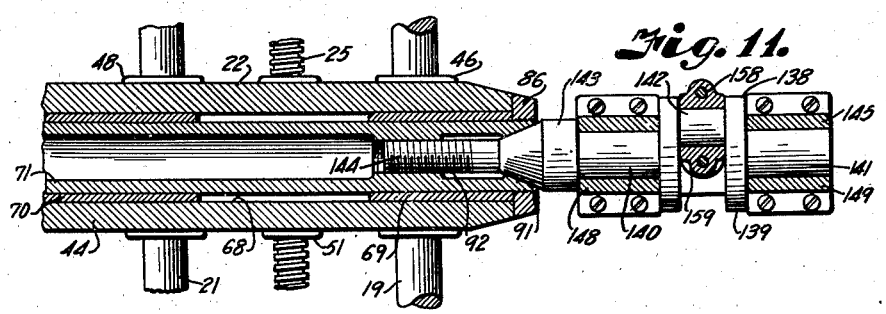
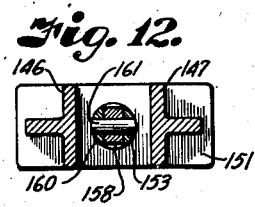

Patented Mar. 23, 1937

2,074,844

UNITED STATES PATENT OFFICE 2,074,844

METALWORKING MACHINE

Charles H. Hill, Trousdale, Kans., assignor to The Master Brake and Appliance Company, Inc., Trousdale, Kans., a corporation of Kansas Application September 8, 1934, Serial No. 743,215

6 Claims. (Cl. 90—15)

This invention relates to metal working machines and more particularly to a lathe conversion attachment and has for its principal object to adapt a turning lathe to milling, grinding, broaching and other operations not ordinarily accomplished in lathe practice and whereby all of the operations necessary in machining an article are accomplished in one set-up of the work, thereby maintaining closer tolerance and accuracy in the finished product.

Another important object of the invention is to provide a simple lathe attachment which is readily mounted on the compound of the lathe and which is adapted to be carried thereby in performing milling, grinding and broaching operations while the work is set up in the lathe.

In accomplishing these and other objects of the invention, as hereinafter pointed out, I have provided improved details of structure, the preferred forms of which are illustrated in the accompanying drawings, wherein:

Fig. 1 is a perspective view of a portion of a lathe equipped with a converter attachment embodying the features of the present invention.

Fig. 2 is an enlarged detail perspective view of the converter attachment equipped with a grinding head.

Fig. 3 is a longitudinal central section through the grinding head particularly illustrating the mounting of the grinding wheel spindle.

Fig. 4 is a horizontal section through the attachment on the line 4—4, Fig. 5, showing the grinding head removed and a milling cutter inserted in the tool carrier.

Fig. 5 is a vertical section on the line 5—5, Fig. 4.

Fig. 6 is a sectional view through the transmission for driving the tool shaft and grinding assembly.

Fig. 7 is a detail perspective view of a tool fixture.

Fig. 8 is a detail perspective view of the clamp plate for securing the attachment to the compound of the lathe carriage.

Fig. 9 is a detail perspective view of a broaching tool used with the converter attachment.

Fig. 10 is a longitudinal sectional view through the broaching tool.

Fig. 11 is a detail sectional view on the line 11—11, Fig. 10, illustrating the mounting of the broaching tool in the tool carrier of the converter attachment.

Fig. 12 is a cross sectional view through the broaching tool on the line 12—12, Fig. 10.

Fig. 13 is a cross section on the line 13—13, Fig. 10.

Referring more in detail to the drawings:

1 designates a lathe of standard construction including a bed 2 having spaced parallel ways 3 and 4 on which are mounted the conventional head and tail stocks 5 and 6 and a carriage 7. The head and tail stocks include the customary lathe centers 8 and 9 for mounting the work in the lathe as indicated at 10 in Fig. 1, the work being driven between the centers by means of a conventional lathe dog 11.

While Fig. 1 specifically illustrates the mounting of the work between the lathe centers, the work may be carried on in a lathe chuck or any other conventional manner depending upon the nature and type of work inserted in the lathe.

The lathe carriage 7 is mounted for longitudinal feed along the ways 3 and 4 as in conventional lathe construction and carries a compound 12 indicated by the turn table 13, the turn table being mounted on a transverse feed mechanism whereby the compound may be moved to and from the work that is positioned in the lathe. Carried on the turn table is a tool post support 14 having a T-shaped slot 15 in which the tool post is normally supported when the lathe is used for initially turning the work to size; however, in the use of the present invention, the tool post is removed and replaced with the lathe converter attachment generally indicated by the numeral 16.

The lathe converter attachment is best illustrated in Figs. 2 to 8, inclusive, and includes a base plate 17 having spaced pairs of guide posts 18—19 and 20—21 projecting upwardly therefrom to mount a tool carrier 22 later described. The upper ends of the guide posts are connected by a head plate 23 conforming in size and shape to the base plate and which cooperates therewith in rotatably mounting a pair of screw shafts 24 and 25 positioned in intermediate alignment between the posts 18—20 and 19—21 of the respective pairs as illustrated in Figs. 2 and 4.

The guide posts preferably include cylindrical rods 26 having reduced threaded ends 27 and 28 forming stop shoulders 29 and 30 engaging against the respective upper and lower faces of the base and head plates when the threaded extensions are projected through openings 31 and 32 that are formed therein. The openings 31 in the lower plate are preferably threaded to receive and anchor the threaded lower ends 27 of the rod; however, the upper ends of the rods extend freely through the openings 32 in the head plate and carry nuts 33 whereby the head plate is clamped against the shoulders 30 to rigidly support the guide posts in parallel spaced relation with each other.

The screw shafts 24 and 25 have reduced bearing portions 34 rotatably mounted in bearing sockets 35 that are formed in the upper face of the base plate as best shown in Fig. 5 and reduced upper bearing portions 36 that are rotatably mounted in sockets 37 formed in bearings 38 that are threaded in openings 39 of the head plate to adjust end play of the shafts.

In order to eliminate friction incidental to the necessary close limits of movement of the shafts in longitudinal direction, the ends thereof are recessed as at 40 to accommodate thrust balls 41 and 42 that are seated in corresponding recesses 43 in the bottom of the sockets 35 and 37 respectively.

The tool carrier 22 includes a tubular body portion 44 having its axis extending in horizontal position between the pairs of guide posts 18—19 and 20—21 and is slidably carried thereon by ears 45, 46, 47 and 48 that project laterally from the respective ends of the body portion and have vertical bores 49 to receive the guide posts as shown in Figs. 4 and 5. Located intermediately of the pairs of ears are similar ears 50 and 51 having threaded openings 52 therein for engaging the threaded shafts 24 and 25.

In order to take up lateral play of the carriage on the guide posts, the ears 45 and 47 are provided with laterally extending rectangular shaped sockets 53 intersecting the bores therein for mounting shoes 55 having concave faces 56 engaging against the cylindrical surfaces of the guide posts as best illustrated in Fig. 4. The shoes are retained in sliding contact with the guide posts by means of set screws 57 that are threaded in openings 58 in the ears and have their ends engaging against the shoes. The outer ends of the set screws are preferably provided with polygonally shaped portions for accommodating a wrench (not shown) whereby the screws may be manipulated to adjust the shoes relatively to the guide post.

In order to rotate the screw shafts for effecting movement of the tool carrier on the guide post, the head plate 23 carries an operating shaft 59 that is rotatably mounted in a bearing opening 60 therein at a point mid-way between the threaded openings 39 previously described.

The shaft 59 projects from the opposite sides of the head plate and carries a spur gear 61 keyed to its lower end by a spline 62, and a crank 63 secured to its upper end by a cap screw 64 as best shown in Fig. 5. Fixed on the reduced ends 36 of the threaded shafts by keys 65 are pinion gears 66 and 67 having their teeth meshing with the teeth of the spur gear 61. It is thus apparent that when the crank 63 is rotated, the gear 61 rotates the pinion gears 66 and 67 to cause rotation of the threaded shafts 24 and 25. Upon rotation of the shafts in the threaded ears 50 and 51 of the tool carrier, the tool carrier is raised or lowered on the guide rods depending upon the direction of rotation of the crank to position the tool carrier in vertical relation to the work as hereinafter described.

Mounted in the ends of the bore 68 of the tubular body portion of the tool carrier are bearing sleeves 69 and 70 for rotatably mounting a hollow shaft 71 to carry the various cutting tool attachments as later described. In order to rotate the shaft 71, the tool carrier supports a motor 72 having a gear housing 73 attached thereto which in turn is fixed to an annular flange 74 formed on the outer end of the tool carrier as best illustrated in Fig. 4, the gear housing being secured to the flange by cap screws 75 extending through openings in the flange 74 and through aligning threaded openings in the housing 73 whereby the housing is retained in abutting relation with the end of the tool carrier and the motor is supported in right angular relation with the axis of the shaft 71.

The armature shaft 76 of the motor projects through the gear housing and is rotatably mounted in anti-friction bearings 77 and 78 which retain therebetween a worm gear 79 that is keyed to the shaft by splines 80 and 81 as best illustrated in Fig. 6. Meshing with the worm 79 is a worm gear 82 fixed in driving relation with the shaft 71 as now to be described. One end of the shaft 71 projects into the gear housing through an opening 83 therein aligning with the opening in the bearings 69 and 70 and carries an annular flange 84 that is retained in engagement with the end wall 85 of the housing by means of an adjusting ring 86 threaded on the opposite end of the shaft and engaging the tool carrier as shown in Fig. 4. The threaded ring 86 and flange 84 thus cooperate to maintain the shaft 71 for rotation in the bearings but fixed against longitudinal movement relatively thereto.

The shaft 71 projects beyond the flange 84 to form a support for the worm gear 82 which is positioned thereon and retained by a cap screw 87 that has its shank threaded in an opening 88 in the end of the shaft, its head engaging a washer 89 which in turn bears against the hub 90 of the gear as best shown in Fig. 4. The opposite end of the shaft is provided with a tapered bore 91 aligning with an inset internally threaded flange 92 formed as an integral part of the shaft 71 to mount a tool fixture 93 now to be described.

The tool fixture is best illustrated in Fig. 7 and includes a threaded shank 94 for engaging the internally threaded flange 92 and a cone-shaped head 95 to wedgingly engage within the tapered bore 91 of the shaft. Projecting outwardly from the head 95 in axial alignment therewith is a threaded extension 96 to mount the various milling cutters, one of which is shown at 97 in Figs. 1 and 4.

The cutters 97 are of conventional type and include disks 98 having openings 99 to receive the threaded extensions 96 of the fixture. The cutter is retained on the threaded extension and against the shoulder 95 by a nut 100 that is threaded on the end of the extension 96 and engages spacing washers 101 and 102 bearing against the side face of the cutter as best illustrated in Fig. 4.

The armature shaft 76 of the motor projects from the gear housing as previously described and mounts a pulley 103 having a peripheral groove 104 for accommodating a belt by which a grinding assembly is operated as now to be described.

Carried by the ears 46 and 48 of the tool carrier and projecting laterally therefrom are threaded studs 105 and 106 for mounting a bracket arm 107. The bracket arm 107 is best illustrated in Fig. 2 and includes a web portion 108 having slotted openings 109 and 110 to receive the studs 105 and 106 whereby the arm is adjusted to and from the pulley 103 to tension a belt 111 operating thereover for driving a grinding wheel spindle 112.

The spindle 112 is rotatably mounted anti-friction bearings 113 and 114 seated in a tubular housing 112 that is mounted in a ring shaped head 115 formed as a part of the bracket 117. The spindle housing is preferably threaddly mounted in a head 116 to position the pulley 117 on the spindle in alignment with the pulley 113 previously described.

The inner end of the housing is closed by an internally threaded cap 118 sleeved over the spindle and engaging the threads 119 on the housing. The opposite end of the housing is closed by a threaded plug 120 threaded in the bore of the housing and engaging the outer bearing 113.

The pulley 117 is fixed on a projecting end of the spindle by a set screw 121 and carries a grinding wheel 122 that is clamped to the face of the pulley by means of a washer 123 and a nut 124 threaded on an integral extension 125 of the pulley as best shown in Fig. 3.

When the bracket is applied to the carrier, the slotted arm is engaged over the studs 104 and 105 and is retained thereon by nuts 126 and 127 as shown in Fig. 2.

In order to mount the converter attachment just described, the base plate 17 thereof is seated on the compound in the place of the conventional tool post (not shown) which has been removed from the T-shaped slot 15. The base plate is then secured to the tool post support of the compound by a clamping plate 128 that is received in the enlarged portion 129 of the slot 15 and which has studs 130 and 131 extending through the narrow portion 132 of the slot and through openings 133 of the base plate.

The projecting ends of the studs carry nuts 134 and 135 to clamp the plate 128 against the shoulders 136 and 137 formed by the T-shaped portion of the slot 15.

It is thus apparent that when the nuts 134 and 135 are tightly secured against the upper face of the base plate, the converter attachment is rigidly secured to the compound so that it may be moved therewith to position the cutter 97 or grinding wheel 122 in any desired relation relative to the axis of the work carried by the lathe centers 8 and 9. It is also apparent that the attachment will be carried longitudinally of the work by the feed of the carriage 7 and transversely relatively to the work through the cross feed of the compound exactly in the same manner as the conventional tool post in ordinary lathe practice.

In order to perform broaching operations, the tool fixture may be removed from the tool carrier and replaced with a broaching tool 138 as shown in Figs. 9 to 13, inclusive. The broaching tool includes a crank shaft 134 having bearing portions 140 and 141 located on opposite sides of a crank portion 142. Extending from the bearing portion 140 is a head 143 similar to the head 95 of the tool fixture and which has a threaded shank 144 that is adapted for threaded engagement with the internal threads of the shaft 71. Loosely mounted on the bearing portions 140 and 141 of the crank shaft is a yoke shaped bracket 145 having arms 146 and 147 carrying bearings 148 and 149 engaging the bearing portions 140 and 141 and having a tubular portion 150 terminating in a head plate 151. Reciprocably mounted in the bore 152 in the tubular portion 150 of the bracket is a shaft 153 having a longitudinal groove 154 in its lower side to mount a broaching cutter 155 having a toothed portion 156 projecting therefrom and which has its rear end reciprocably mounted in a guide slot 157 formed in the tubular portion 150 of the bracket in line with the groove 154.

The portions of the broaching tool thus operating in the slot 157 retain the shaft 153 against rotation in the bore 152 while it is being reciprocated by the crank 142 through a connecting pitman 158. The pitman 158 includes a bearing portion 159 engageable over the bearing portion of the crank and its opposite end is connected with the yoke shaped end 160 of the shaft 153 by means of a wrist pin 161.

It is thus apparent that when the broaching device is applied to the tool carrier and the cone shaped portion of the head is wedged within the tapered portion of the shaft, the crank will be rotated upon rotation of the shaft 71 to effect reciprocation of the broach bar to produce a saw like cut in the work being operated upon.

In using a lathe converter of the character described to perform a milling operation on a work piece that has been turned to size in the lathe, for example for milling teeth on the work piece shown in Fig. 1, the tool post is removed from the compound leaving the work piece set up in the lathe in exactly the same position in which it was turned.

The lathe converter is then applied on the compound and clamped in the T-shaped slot 15 by the plate 128. If the teeth are to extend longitudinally to the axis of the work piece, the turn table 13 is set up so that the axis of the shaft 71 is at right angles to the axis of the work piece. A cutter such as indicated at 98 is then secured to the tool fixture and the tool fixture is inserted in the shaft 71. The tool carrier is then positioned by turning the crank 63 so that the cutter is brought above the level of the work piece. The motor 72 is then energized to cause rotation of the shaft 71 through the worm and worm gears 79 and 82 to drive the cutter 98. The compound is then moved so that the cutter is positioned in line with the cut to be made in the work piece after which the tool carrier is lowered by rotating the crank 62 so that the cutter is in position to make the required depth of cut.

The carriage 7 can then be moved longitudinally of the lathe bed either by the hand or power driven feeds of the lathe to cause the cutter to make a longitudinal cut in the work piece. The work piece can then be rotated between the centers to form sides of the adjacent teeth in like manner, a suitable indexing device (not shown) being used in conjunction with the face plate of the lathe to position the work piece to space the respective cuts similarly to the index on a conventional type milling machine.

If the teeth are to be spirally arranged on the work piece, the turn table 13 can be adjusted to the proper angle to cut the desired spiral when the cutter 99 is moved across the work piece by the hand feed of the lathe.

In case a broaching operation is to be performed, the fixture carrying the cutter 97 is removed and the broaching tool shown in Fig. 9 is inserted in the place thereof.

Upon rotation of the shaft 71, the crank of the broaching tool will rotate therewith to effect reciprocation of the rod 153 to cause the teeth 156 to produce a broaching cut in the work to form, for example, the keyway within a hollow hub or the like.

When the converter is to be used for grinding purposes, the grinding head is applied to the tool carrier in the manner shown in Fig. 2 and the pulley 117 is belted to the pulley 103 by the belt 111 so that the armature shaft 76 of the motor will operate the grinding wheel 122, the adjustments to the tool carrier being made in a similar manner as in the set-up employing the milling cutter.

From the foregoing, it is apparent that I have provided a lathe converter whereby a conventional type lathe is readily adapted to perform various milling, cutting, broaching and similar operations on a work piece without removing the work piece from the lathe and I am thereby enabled to attain closer tolerances and more accurate work than when the work piece is removed from the lathe and set up in a conventional milling or grinding machine.

It is also apparent that a small machine shop equipped with a lathe can, with the aid of my attachment, perform all the milling and grinding operations that are carried on in a large shop equipped with conventional milling and grinding machines.

What I claim and desire to secure by Letters Patent is:

1. In a device of the character described including base and head plates, guide posts connecting said plates, a pair of screw shafts having their ends rotatably mounted in the plates, a tool carrier slidable on the guide posts and having threaded connection with said screw shafts, gears on the screw shafts, a gear interconnecting said gears, and means for rotating one of the gears to actuate the screw shafts for moving the tool carrier on the guide posts.

2. In a device of the character described including base and head plates, guide posts connecting said plates, a pair of screw shafts having their ends rotatably mounted in the plates, a tool carrier slidable on the guide posts and having threaded connection with said screw shafts, gears on the screw shafts, a gear interconnecting said gears, means for rotating one of the gears to simultaneously actuate the screw shafts for moving the tool carrier on the guide posts, a motor on the tool carrier, a rotary tool mounting means on the tool carrier, and a driving connection between the motor and said tool mounting means.

3. In a device of the character described, base and head members, spaced pairs of guide posts connecting said members, a pair of threaded shafts having their ends rotatably mounted in said base and head members, a tool carrier having ear portions slidably engaging said posts and threaded ear portions engaging the threaded shafts, a shaft rotatable in the tool carrier, means on the tool carrier for rotating the shaft, a tool fixture carried by the shaft, and means for rotating said threaded shafts to move the tool carrier on the guide posts.

4. In a device of the character described, base and head members, spaced pairs of guide posts connecting said members, a pair of threaded shafts having their ends rotatably mounted in said base and head members, a tool carrier having ear portions slidably engaging said posts and threaded ear portions engaging the threaded shafts, a shaft rotatable in the tool carrier, a gear housing on the tool carrier, a motor carried by the gear housing, gearing in said housing connecting the motor with the shaft, a tool fixture carried by the shaft, and means for rotating said threaded shafts to move the tool carrier on the guide posts.

5. In a device of the character described, base and head members, spaced pairs of guide posts connecting said members, a pair of threaded shafts having their ends rotatably mounted in said base and head members, a tool carrier having ear portions slidably engaging said posts and having threaded ear portions engaging the threaded shafts, gears on the threaded shafts, an intermediate gear connecting the shaft gears, and means for rotating said intermediate gear to effect movement of the tool carrier on the guide posts.

6. In a device of the character described, a frame including spaced guide members and cross members rigidly connecting upper and lower ends of the guide members, a pair of threaded shafts rotatably mounted in the cross members of the frame, a single tool carrier having portions slidably engaging said guide members to retain said tool carrier at an even elevation and having threaded portions engaging said shafts, gears on said shafts, a common gear intermeshing with said gears, means rotatably mounting the common gear on one of the cross members, and means for rotating one of the gears to rotate said shafts in said threaded portions of the tool carrier to move the tool carrier on said guide members.

CHARLES H. HILL.